E. N. YARDLEY.
Attachment for Plows.
No. 162,210. Patented April 20, 1875.
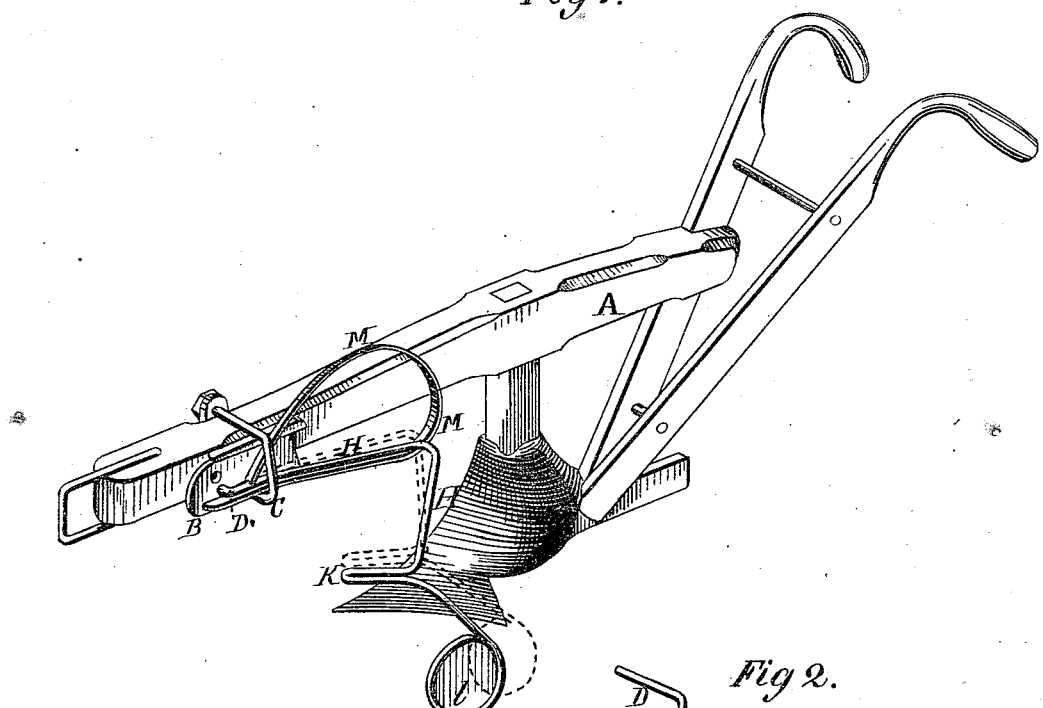
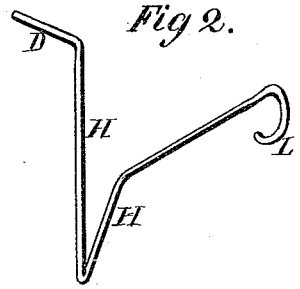
Witnesses:
Chas. C. Gill
Fred. R. Goodridge
Inventor:
Elisha N. Yardley
by his attys
Cox & Cox

UNITED STATES PATENT OFFICE.

ELISHA N. YARDLEY, OF TONGANOXIE, KANSAS.

IMPROVEMENT IN ATTACHMENTS FOR PLOWS.

Specification forming part of Letters Patent No. 162,210, dated April 20, 1875; application filed October 27, 1874.

*To all whom it may concern:*

Be it known that I, ELISHA N. YARDLEY, of Tonganoxie, Leavenworth county, Kansas, have invented a new and useful Improvement in Attachment for Plows, of which the following is a specification:

The invention relates to attachments for plows. Its object is to provide an implement which may be readily attached to plows of all constructions, and which effectually turns down and holds in such manner that it is covered by the action of the plow-share whatever vegetation is between the point of the share and the furrow next thereto.

In the accompanying drawings, Figure 1 is a perspective view of a device embodying the invention. Fig. 2 is a detached view of a form of the attachment.

A is the beam of the plow, to which, near its forward extremity, is secured the metallic plate B by means of the clevis C, and otherwise, as will hereinafter appear. In the plate B an aperture is cut which is continued through the plow-beam, through which is passed the upper extremity of the attachment D, which occupies a horizontal position when the device is attached; or a box, E, may be fastened to the lower side of the plow-beam, as in the present instance. The extremity of the part D extends beyond the side of the plow-beam or box removed from the plate B, and is provided with a thread to carry a nut by which the attachment is securely made fast.

In Fig. 1 of the drawings the shape of the device is shown with distinctness. It consists of a single rod of iron bent and curved so as to produce the lines and angles substantially as shown.

The invention, as embodied in the present device, may be described as beginning at the part D, above mentioned, next to which, and at about a right angle thereto, occupying nearly a horizontal position parallel to the plow-beam, is the drag-bar H, which is bent at I substantially at right angles to the drag-bar H, and depending to a point near the plow-share, from which point extends forward somewhat in advance of the point of the plow-share, from whence it curves backward, forming a point at K, and terminating in the loop L, which projects forward in a plane about parallel to the drag-bar H, and in which is placed the shield *l*, that may be of wood, the object of which is to prevent the loop from becoming clogged with vegetation.

The length of the point K should be such that when the device is attached the loop L will occupy the furrow next to that which is being made; and the other parts should be adapted to the height and length of the plow to which they are to be applied.

In the present instance I have applied a spring, M, which may be advantageously used when the vegetation is exceptionally heavy, but which may be omitted without destroying or impairing the invention.

It is entirely obvious that the construction I have described is not the only one which may be effectively employed, and I do not confine myself to it. Thus all the parts of the attachment, (including the plates, clevis, pivot D, drag-bar H, and spring M,) except the point K and loop L, may be omitted, and other expedients resorted to which will serve to hold the said essential features in place.

Any proper means for holding the sweep and loop in the position shown may be successfully made use of without impairing the prime object of the invention.

It is, however, important that the said essential parts be so arranged as to have a yielding pressure to accommodate them to the inequalities of the surface of the ground, and other incidents.

The operation of the device is as follows: Having applied it to the plow, the plowing is proceeded with. The point of the share entering the earth, the forward extremity of the point K, dividing the vegetation, carries it toward the loop L, at the same time bending it down and coacting with the plow-share to roll or turn it in line with the sod which is borne by the share over the roll of vegetation, covering it completely.

Thus the vegetation is so directed that it is virtually wrapped in the sod without interfering with the ordinary functions of the plow, and thus effectually "turned under."

What I claim as my invention, and desire to secure by Letters Patent, is—

The bent drag-bar H, pivoted to the plow-beam A, point K, and loop L, constituting a plow attachment, for the purpose specified.

In testimony that I claim the foregoing improvement in attachments for plows, as above described, I have hereunto set my hand and seal.

ELISHA NICHOLAS YARDLEY. [L. S.]

Witnesses:
 JOHN BRANDON,
 GEO. BRANDON.